(12) United States Patent  
Fraenkel et al.

(10) Patent No.: US 7,980,785 B2  
(45) Date of Patent: Jul. 19, 2011

(54) SUPPORTING ARTICLES/LOADS

(75) Inventors: Peter L. Fraenkel, Ealing (GB); Angela S. Robotham, Staple Hill (GB)

(73) Assignee: Marine Current Turbines Limited, Bristol (GB)

( * ) Notice: Subject to any disclaimer, the term of this patent is extended or adjusted under 35 U.S.C. 154(b) by 542 days.

(21) Appl. No.: 11/911,462

(22) PCT Filed: Apr. 20, 2006

(86) PCT No.: PCT/GB2006/001448  
§ 371 (c)(1),  
(2), (4) Date: Aug. 11, 2008

(87) PCT Pub. No.: WO2006/111756  
PCT Pub. Date: Oct. 26, 2006

(65) Prior Publication Data  
US 2009/0220308 A1    Sep. 3, 2009

(30) Foreign Application Priority Data

Apr. 20, 2005    (GB) .................................. 0507913.2

(51) Int. Cl.  
*E02B 17/06* (2006.01)  
*E02B 17/08* (2006.01)
(52) U.S. Cl. ......................................... 405/199; 24/463
(58) Field of Classification Search .................. 405/199, 405/232; 24/463  
See application file for complete search history.

(56) References Cited

U.S. PATENT DOCUMENTS

| 2,775,869 A | 1/1957 | Pointer ........................ 61/46.5 |
| 2,934,804 A | 5/1960 | Suderow ......................... 24/263 |
| 3,844,002 A | 10/1974 | Slemmons ....................... 24/263 |
| 4,075,860 A | 2/1978 | Hansen ............................. 61/87 |
| 4,408,932 A | 10/1983 | Cowan .......................... 405/227 |
| 4,497,582 A | 2/1985 | Lipman et al. .................. 368/15 |
| 4,497,592 A | 2/1985 | Lawson ......................... 405/202 |
| 4,706,757 A | 11/1987 | Harrington ................... 166/349 |
| 5,035,542 A | 7/1991 | Bassett ......................... 405/227 |
| 5,123,410 A | 6/1992 | Greene et al. ............. 128/207.17 |
| 5,244,312 A | 9/1993 | Wybro et al. ................. 405/204 |
| 5,743,677 A | 4/1998 | Phillips et al. ................ 405/227 |

FOREIGN PATENT DOCUMENTS

| GB | 2 311 566 A |   | 10/1997 |
| GB | 2 347 976 A |   | 9/2000 |
| GB | 2 348 250 A |   | 9/2000 |
| GB | 2396666 A | * | 6/2004 |

* cited by examiner

*Primary Examiner* — Tara Mayo-Pinnock  
(74) *Attorney, Agent, or Firm* — Brinks Hofer Gilson & Lione

(57) ABSTRACT

A locking arrangement for selectively preventing displacement of a tubular article/load support structure (2) circumscribing the upstanding elongate support (1) and adapted for lengthways displacement along upstanding elongated support, wherein the tubular support structure (2) incorporates means (13) for releasably locking the tubular support structure against said lengthways displacement in such manner as to be able to maintain the article/load at any required position relative to the elongate support.

17 Claims, 16 Drawing Sheets

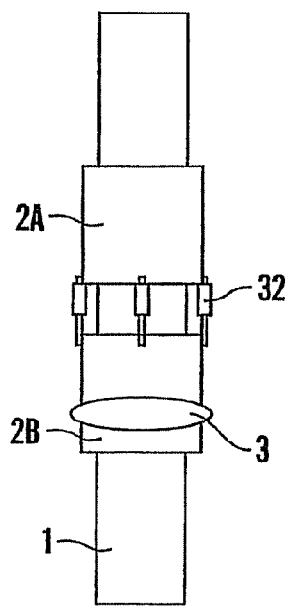
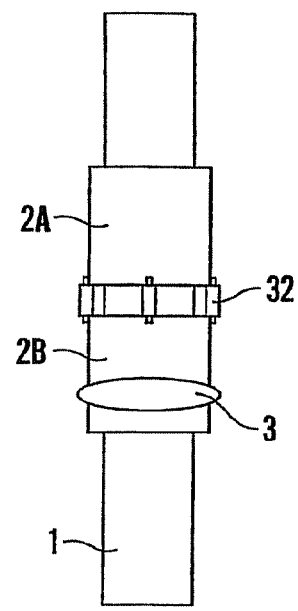
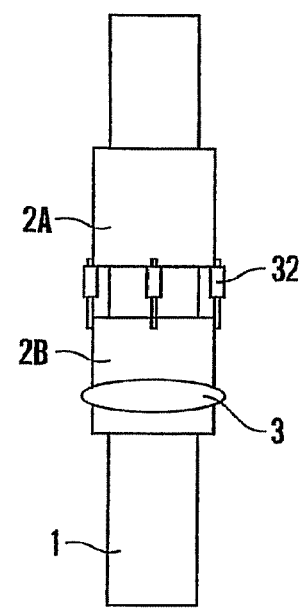
Fig.15D  Fig.15E  Fig.15F
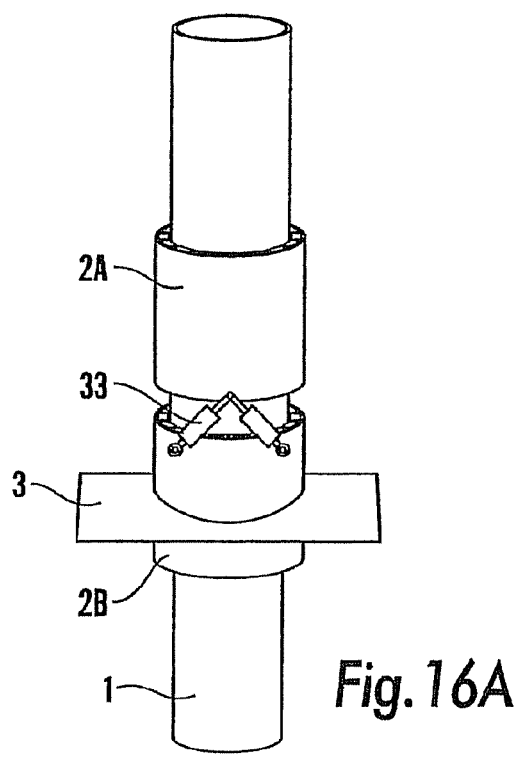
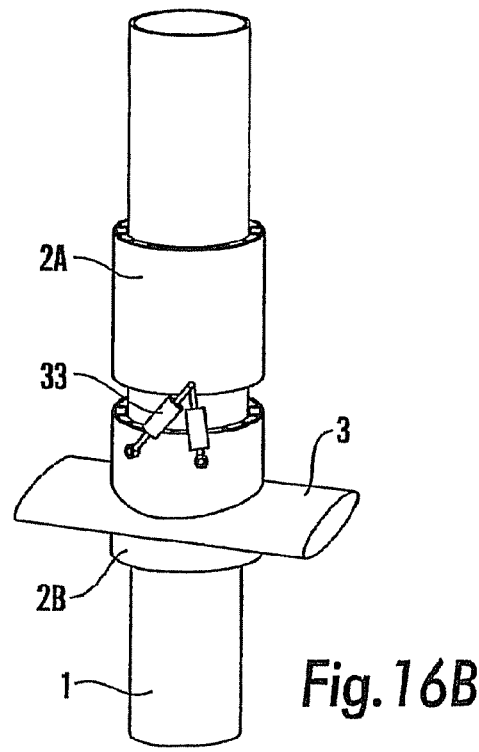
Fig.16A  Fig.16B

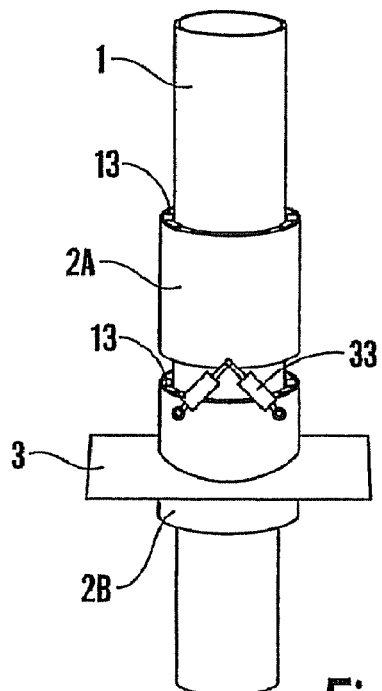
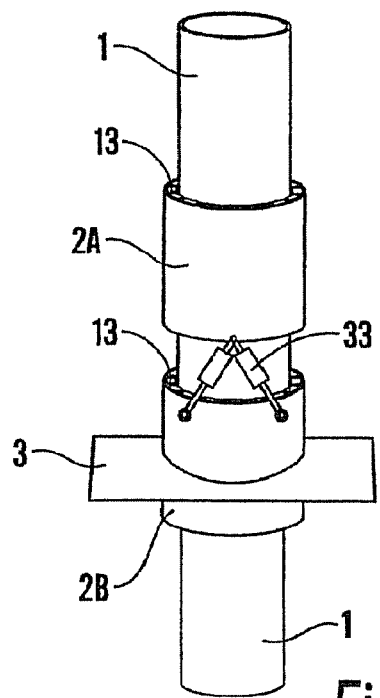
Fig.17A  Fig.17B
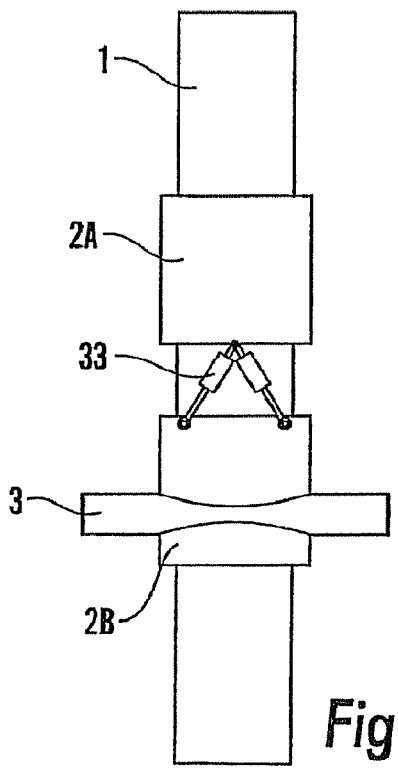
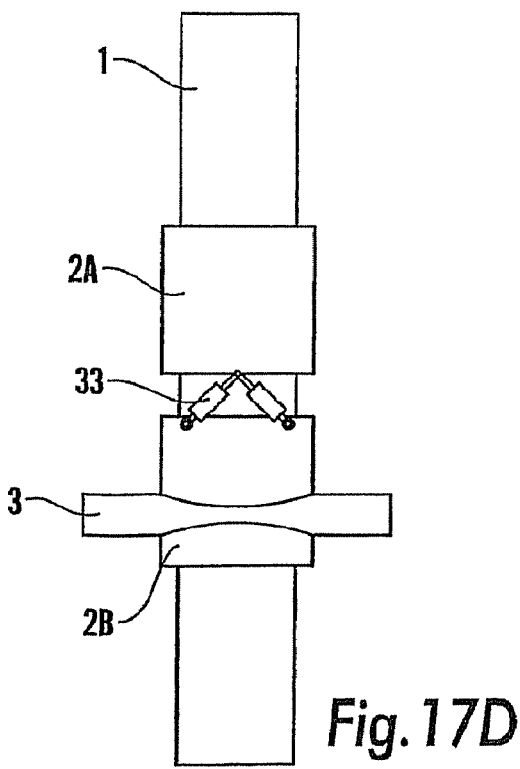
Fig.17C  Fig.17D

SUPPORTING ARTICLES/LOADS

BACKGROUND OF THE INVENTION

This invention relates to the supporting of articles/loads including water and/or air driven turbine installations from an upstanding elongate support such as a column or pile.

It is well known to mount turbine installations from an upstanding column or pile so that the turbine installation may be immersed in water for the purposes of driving the turbine, by water flows and/or air flows.

In many situations it is necessary to be able to displace whatever load is being supported by the elongate support lengthways of the elongate support and interconnect i.e., lock the articles/loads against relative displacement lengthways of the elongate support once the articles/load reaches a required position.

As will be understood in relation to water driven turbines such turbines operate whilst submerged. However, it is from time to time necessary to be able to raise the turbine out of water, for example, for maintenance purposes or to adjust the working level of the turbine.

Arrangements for carrying out this type of operation have been disclosed in, for example, our British Patents GB 2311566 "Column Mounted Water Current Turbine", GB 2347976 "Variable Pitch Water Turbine", GB 2348250.

OBJECTS OF THE INVENTION

It is a particular object of the invention to provide arrangements for improving the support and handling of articles/load such as turbines installations mounted from an upstanding support column, that is required to be positionally displaceable lengthways of an upstanding support column or pile.

STATEMENTS OF THE INVENTION

According to a first aspect of the invention there is provided a locking arrangement for selectively preventing displacement of a tubular support structure adapted to be concentrically displaceable lengthways of an upstanding elongate support, wherein the tubular support structure includes means for releasably locking the tubular support structure against said lengthways displacement, and wherein tubular support structure is adapted for supporting a turbine installation or other article/load with respect to the upstanding elongate support.

A further aspect of the invention provides a locking arrangement for selectively preventing displacement of a tubular article/load support structure circumscribing the upstanding elongate support and adapted for lengthways displacement along upstanding elongated support, wherein the tubular support structure incorporates means for releasably locking the tubular support structure against said lengthways displacement in such manner as to be able to maintain the article/load at any required position relative to the elongate support.

Preferably the means for effecting said releasable locking incorporates selectably operable means for exerting clamping/gripping force against the outer surface of the elongate support in such manner as to prevent, at any selected position lengthways of the elongated support, displacement of the support structure relative to the elongated support.

Conveniently, the locking means incorporates gripper devices arranged internally and concentrically of the tubular support structure, said gripper devices being operable to co-operate with the outer surface of the upstanding elongate support to prevent the displacement of the tubular support structure.

BRIEF DESCRIPTION OF THE DRAWINGS

FIGS. 16A and 16B are respectively, a perspective view and a side elevation, showing the use of hydraulic rams or other linear actuators are installed in pairs set at a suitable angle to the vertical, and if they are connected to the collar through suitable moveable joints (e.g., ball and socket), then by fixing the upper collar to the pile with its grippers and extending one actuator while holding the other retracted causes the lower collar to turn through a small angle about the axis of the column or pile.

FIGS. 17A, 17B, 17C and 17D are views similar to the arrangements of FIGS. 16A to 16D, demonstrating how by extending and retracting the paired inclined linear actuators in unison the spacing between the collars can be increased and decreased so as to cause the collars to "walk" the collars up or down the pile.

DETAILED DESCRIPTIONS OF EMBODIMENTS OF THE INVENTION

Figure 1A:
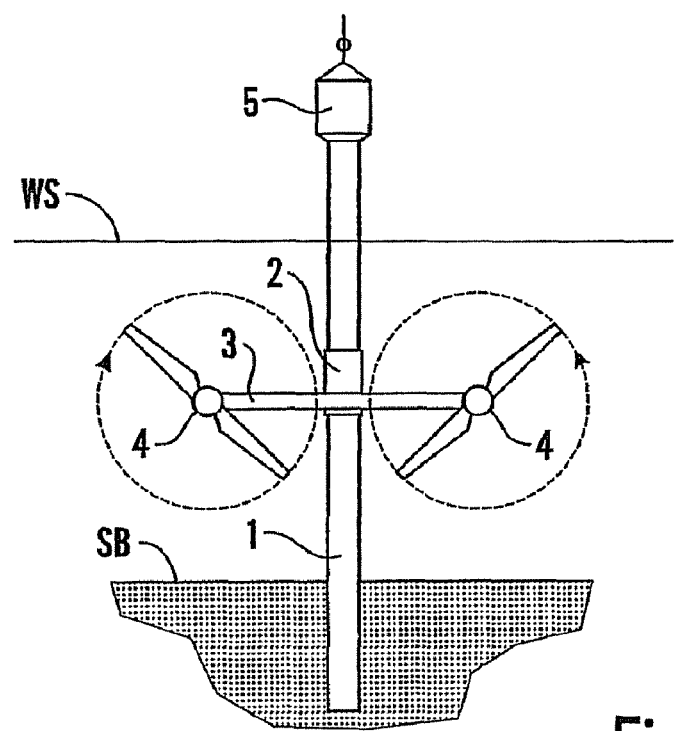
FIG. 1A illustrates the basic concept of a pile mounted water current turbine as covered by our earlier above mentioned patents. The figure represents a "Variable Pitch water turbine" and various similar patents in other countries and regions and shows how twin rotors may be arranged laterally to the pile to face the flow direction of the current (in the Figure this can be imagined as lowing either "into the page" or "out of the page") and mounted on a collar or sleeve which is concentric to the pile, the Figure illustrating the turbines when immersed.
Figure 1B:
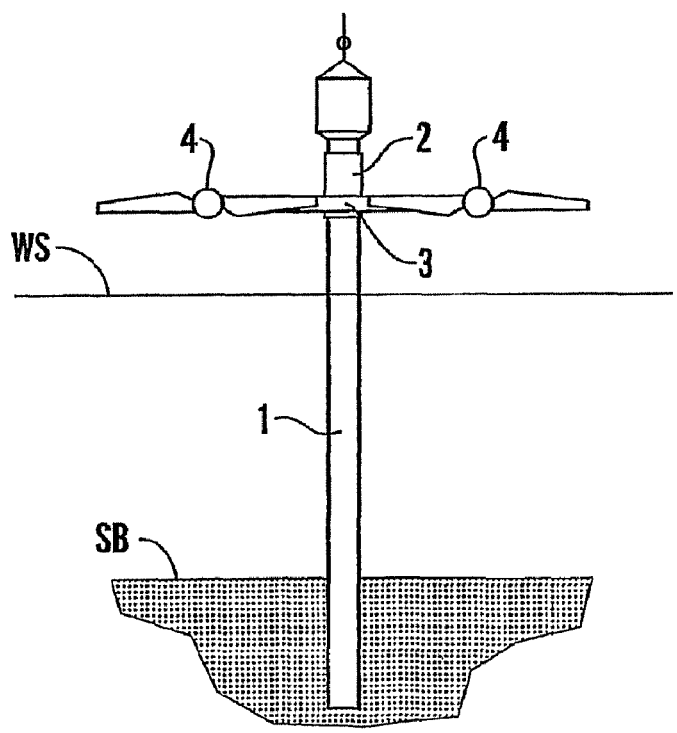
FIG. 1B illustrates the arrangement of FIG. 1A when the turbines have been raised above water level.

Referring to the drawings in more detail, and particularly to FIGS. 1A and 1B which illustrate water current powered turbines (or possibly also to air current powered wind turbines") where a vertical support column or (1) upstanding from a sea or river bed SB upon column and projecting above the surface WS of the water. Mounted to the column (1) is a support structure (2) including a collar/sleeve arrangement mounting a streamlined wing-like arm (3) projecting to either side of the column. The wing-like arm (3) serves to support water current powered turbines (or possibly also air current powered wind turbines and their rotors (4). The support structure (2) is such that the arm (3) can be raised or lowered vertically with respect to the fixed supporting column (1). In FIG. 1A it will be noted that the wing-like arm (3) is horizontal (or near horizontal) streamlined and laterally extending laterally to the flow so as to present the turbines rotors normal to the flow for efficient operation. A housing (5) for receiving, for example, control equipment (not shown) is provided at the top of the column.

FIG. 1B illustrates the support structure (2) together with the cross arms (3) and rotors (4) when raised above the surface of the water to a raised position to facilitate maintenance or repairs. In the case of a wind turbine (not shown), which generally but not necessarily will have a single centrally mounted rotor, the power nacelle may in a similar manner be lowered down the supporting column from its raised operational position, so as to facilitate maintenance or repairs.

Figure 2A:
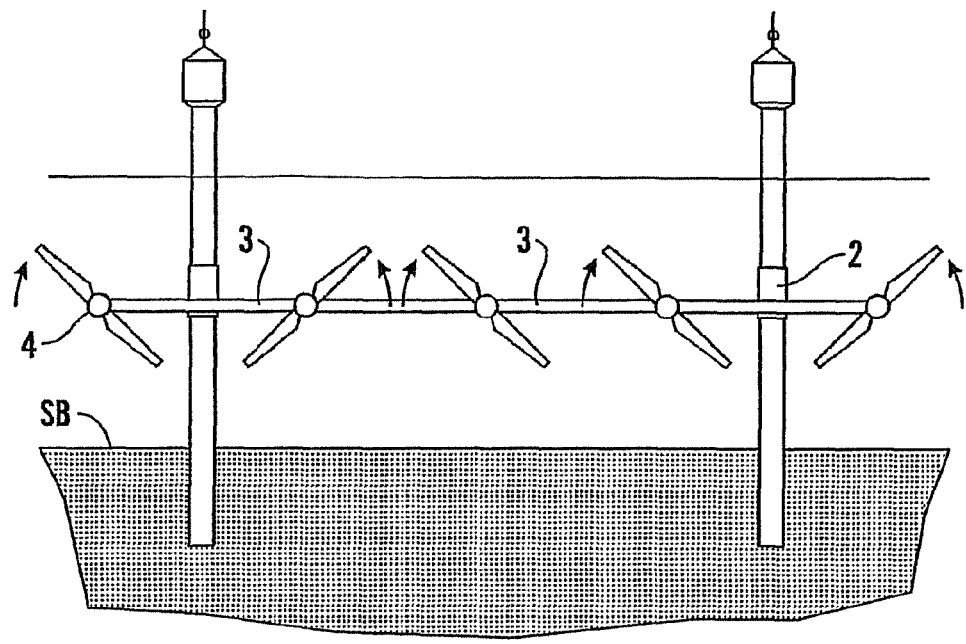
FIG. 2A is a view similar to that of FIG. 1 illustrating the mounting of a multiplicity of turbines from the pile and when the turbines are immersed.
Figure 2B:
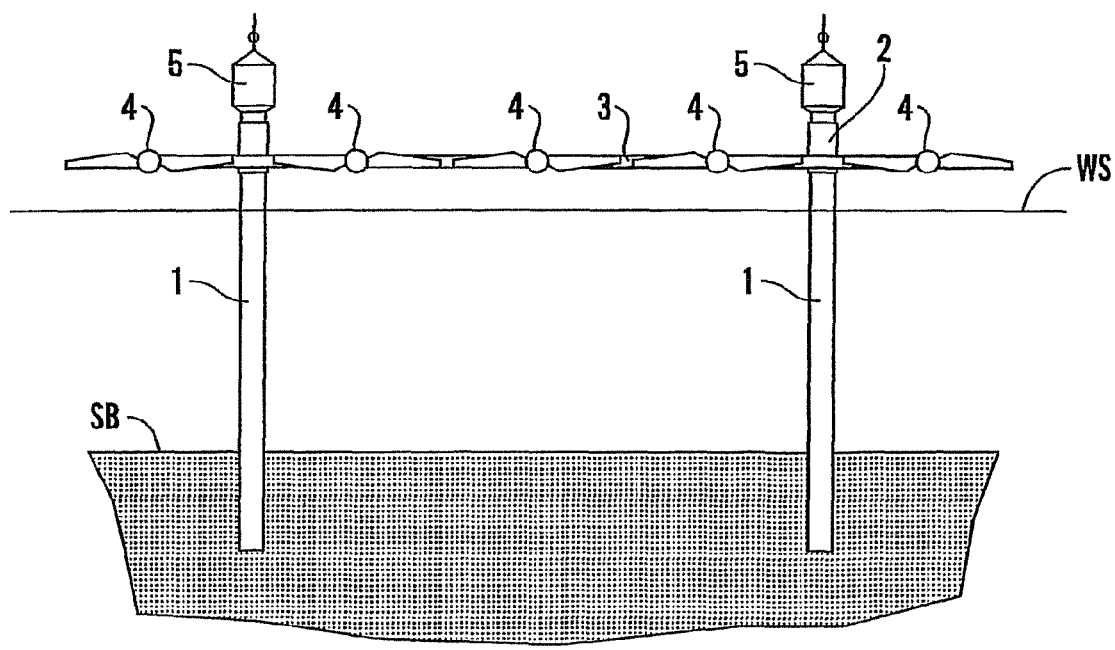
FIG. 2B illustrates the arrangement of FIG. 2A when the turbines have been raised above water level.

FIGS. 2A and 2B illustrates how two piles or supporting columns (1) can be used similarly to FIG. 1 to carry a plurality of turbines and rotors (4) all mounted on an extended wing-like near horizontal streamlined member (3) which can both bridge the gap between the support columns (1) and which can also be extended and cantilevered out either side of the support columns. Although five rotors are shown by way of illustration, other numbers may be applicable in variations of this invention. In this case the support structures (2) are slideable with respect to each pile support column (1) and need to be raised or lowered simultaneously so as to keep the rotors and their support member near to horizontal. As with the single pile or column (1) embodiment of FIGS. 1A and 1B the entire set of turbines and rotors (4) may be raised above the water surface (WS.) This is illustrated in FIG. 2B.

Figure 3A:
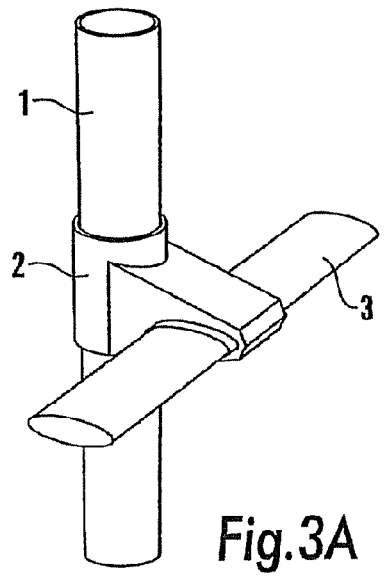
FIG. 3A, is schematic oblique view of a first arrangement for mounting a turbine support structure to a column.
Figure 3B:
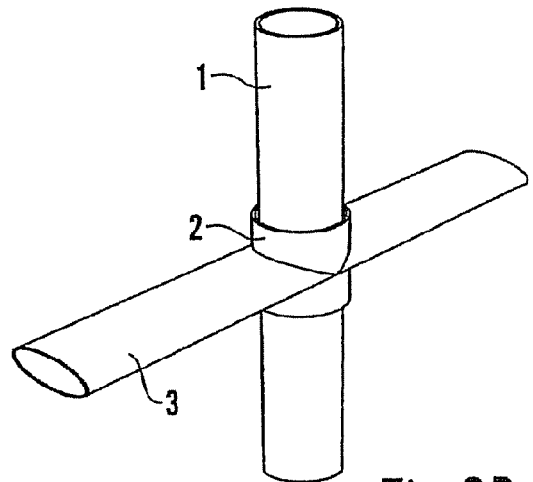
FIG. 3B, is schematic oblique view of a second arrangement for mounting a turbine support structure to a column.

FIG. 3A schematically indicates how the streamlined horizontal cross-arm (3) intended to carry two or more rotors (which are not illustrated in this figure) can support structure (2) or alternatively as indicated in FIG. 3B how it can be aligned such that the centre line of the streamlined horizontal cross-arm (3) is coincident and symmetrical with the centre line of the column (1) and support structure collar (2). It will be understood that positionally intermediate locations may be used in which the streamlined horizontal cross-arm (3) is partially offset and partially overlaps with the column and support structure, but these have not been illustrated.

Figure 4A:
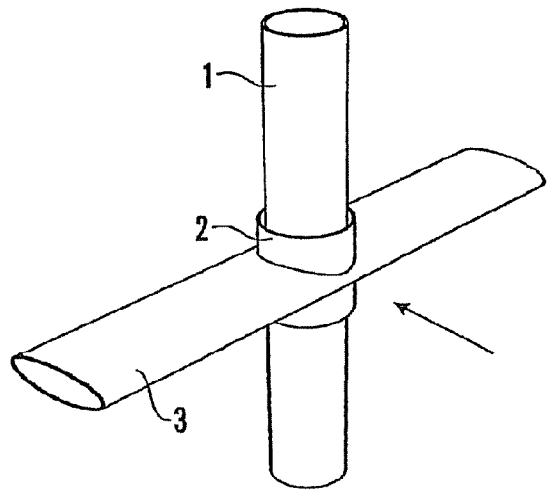
FIG. 4A, is schematic oblique view of a further arrangement for mounting a turbine support structure to a column.
Figure 4B:
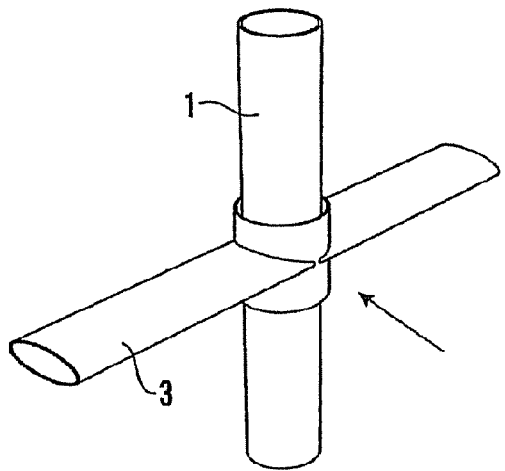
FIG. 4B is schematic oblique view of a still further arrangement for mounting a turbine support structure to a column.

FIGS. 4A and 4B indicate that the horizontally arranged streamlined (3) may be varied in chord length such that it is broader in the horizontal plane than the diameter of the support the cross arm rather than completely splitting the cross arm (3) into two parts one to either side of the column (1). Alternatively the cross arm (3) may be narrower in chord length than the structure (2) in which case the arm (3) it is cantilevered from the collar in the manner of two separate components separated by the support structure and shaped to fit the collar profile, of the support structure. The examples in FIGS. 3A and 4B illustrate the horizontal cross-arm chord length coinciding with the diameter of the support structure collar, a case similar to that of FIG. 4B and that the horizontal cross-arm (3) is effectively in two parts. The arrangement of FIG. 4A indicates that the cross-arm (3) may be constructed as a single unit and connected to the support structure collar by a single circumferential weld or joint on each of its upper and lower surfaces where the collar penetrates through the cross-arm. In practice the embodiment is as shown in the FIG. 4A, is preferred since this results in a more favourable joint between the cross-arm and the collar or sleeve.

It will be noted that FIGS. 3A, 3B and 4A, 4B effectively indicate different methods for interfacing the horizontal member(s) with the vertically moveable concentric collar. In FIG. 3 it is shown how the horizontal member may either be offset from the pile or it may be aligned such that its centre line is aligned with that of the pile; various intermediate arrangements between those shown in FIG. 3 are also possible. FIG. 4 shows how in the case where the horizontal member is aligned (or overlaps) with the pile it may either have a chord length or width greater than the collar or sleeve, or it may be smaller.

Figure 5A:
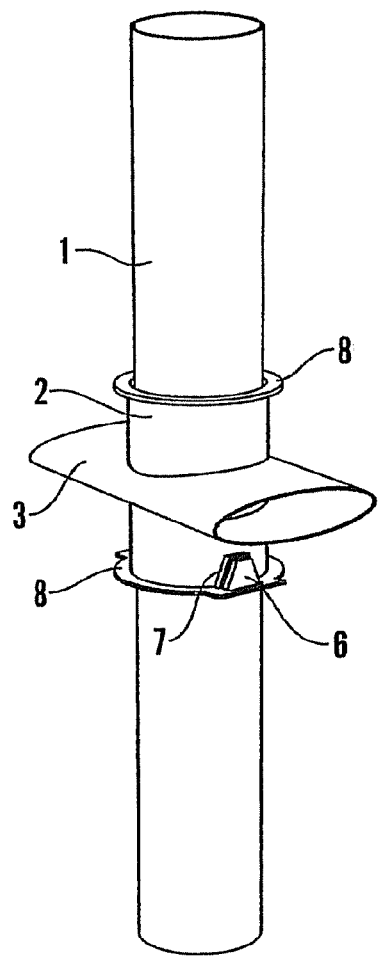
FIG. 5A, is schematic oblique view of a first setting of a further arrangement for mounting a turbine support structure to a column.
Figure 5B:
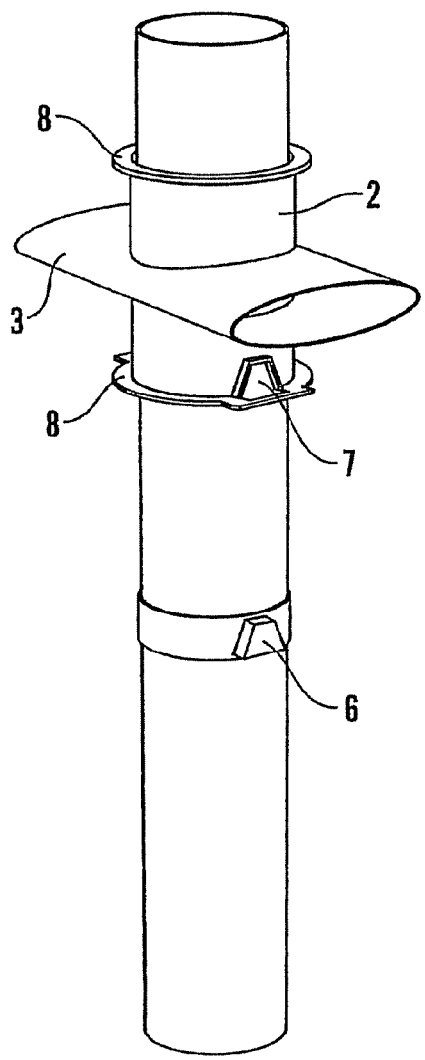
FIG. 5B is schematic oblique view of a second setting of the arrangement of FIG. 5A for mounting a turbine support structure to a column.

Referring now to FIGS. 5A and 5B these illustrate how the column (1) may have one or more tapered lug (6) projecting from it which can engage with a correspondingly shaped slot/recesses (7) in the base of the collar or sleeve (2) when it is lowered. In practice more than one lug and recess may be provided FIG. 5A shows the structure collar (2) with its slot (7) engaging the lug (6) in its lowermost position corresponding to turbines supported from the column (1) being immersed, whereas the FIG. 5B shows the structure (2) raised for more clarity illustration of the lugs and slots/recesses of the arrangements.

In practice, the lug (6) therefore acts as a stop to prevent the collar (2) descending below its desired operational position, and in addition by ensuring a close fit between the slot (7) in the structure (2) and the lug (6) prevents the support structure from turning with respect to the pile or column (1) under the influence of differential thrusts from twin rotors (4) or even from a single rotor (4). In other words the lug and the slots act as a 'key' to ensure that forces transmitted from the rotors through the cross-arm (3) into the structure (2) are effectively transferred to support structure and thence to the pile or column (1) hence to the sea bed (SB) in which the pile or column (1) is embedded. The taper of the lug and recess combination is sufficient to ensure the collar does not jam onto the lug and therefore can easily be raised when necessary. In practice, high loads acting on the slot (7) in the collar may tend to cause distortion of the lower part of the collar. This situation may be mitigated by adding a shaped flange (8) to provide a closed load path. Other reinforcements such as flanges may also be added but have not been illustrated. Thus FIGS. 5A and 5B shows how the support structure carrying the horizontal wing like arm (3) may be prevented from turning with respect to the pile when lowered.

Figure 6B:
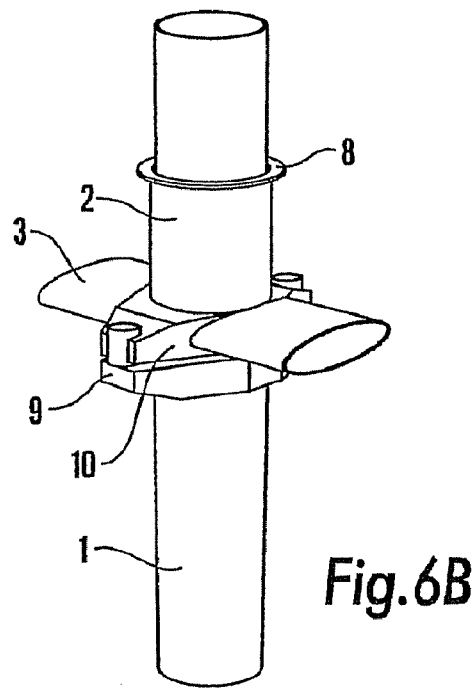
FIG. 6B is schematic oblique view of a second setting of the arrangement of FIG. 6A for mounting a turbine support structure to a column.
Figure 6A:
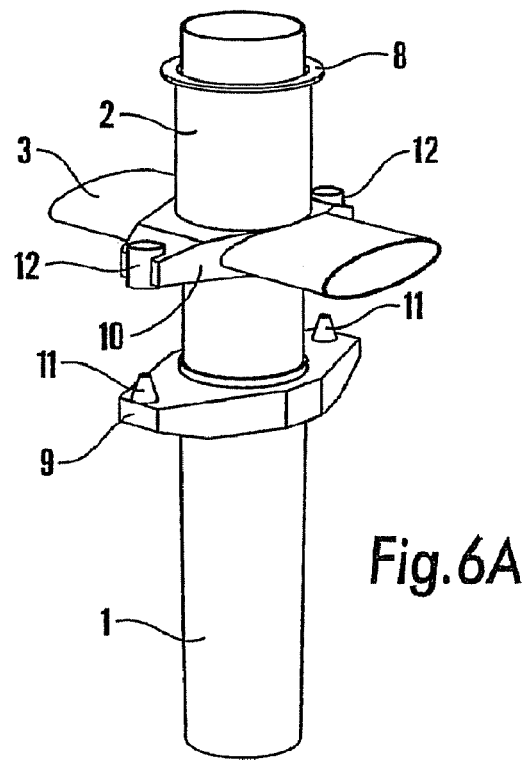
FIG. 6A, is schematic oblique view of a first setting of a further arrangement for mounting a turbine support structure to a column.

FIGS. 6A and 6B show an alternative arrangement to those of FIGS. 5A and 5B to achieve the same objectives of providing a stop position that limits the travel of the collar (2) down the column (1). In this case a fixed bracket-like member (9) is fitted to the column (1), preferably circumferentially as illustrated so as to spread the load, and that is arranged to engage with a similarly shaped bracket-like member (10) fitted to the collar. The member (9) carries conical lugs (11) that can engage with hollow mating surfaces schematically shown at (12) in the member (10). The inter-engagement of the lugs (11) and the surfaces (12) serve both to support the collar/sleeve structure (2) with its streamlined cross-arm (3) and the rotors (not illustrated here) resist any relative torsional forces trying to turn or twist the support structure (2) relative to the column or pile (1) and thus to prevent the turbines (4) from turning about the vertical axis of the pile or support column (1). The conical shape of the lugs (11) is to prevent the member (10) from jamming onto the member (9) so that it can readily be lifted clear. FIG. 6B shows the support structure collar and cross-arm when in their lowermost position with members (9 and 10A) engaged with each other while the FIGS. 6A and 5B shows them when separated. The support member (9) and its connecting member (10) are aligned with the direction of water flow so as to minimise disturbance of the flow around the pile or column, (1) whilst projecting sufficiently far "fore and aft" of the column to reduce the loads on the members (9 and 10).

Figure 7B:
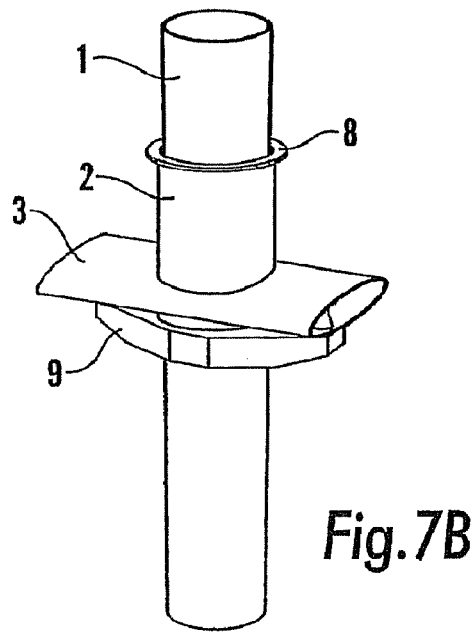
FIGS. 7A and 7B illustrate a variation of the proposals of FIGS. 6A and 6B resist any relative torsional forces trying to turn or twist the support structure collar or sleeve relative to the column pile.
Figure 7A:
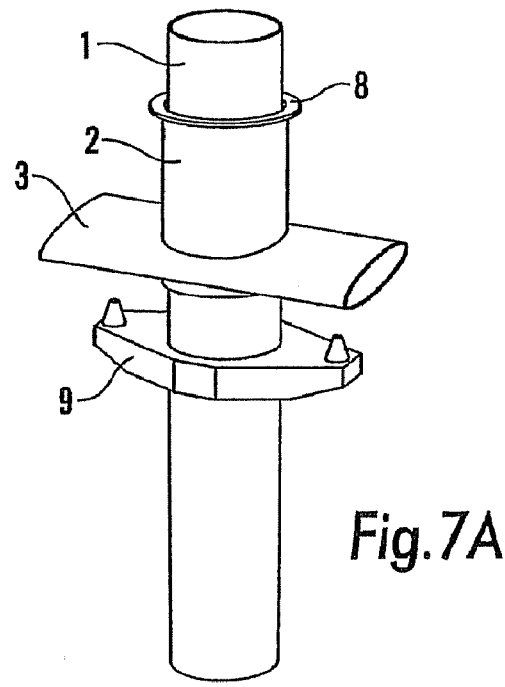

FIGS. 7A and 7B shows an arrangement which works in principle much like that of FIGS. 6A and 6B except that the FIGS. 7A and 7B arrangement this time the support bracket (4A) is arranged laterally to the pile or support column (1) and across the flow, direction of the water. Whilst this positioning will result in more disturbance of the water flow which may be less desirable than the arrangement in FIGS. 6A and 6B the cross-arm (3) can be used to engage with the support bracket (9) by providing suitable holes or recessed hollow mating surfaces in its lower surface (not visible in the diagram). The advantage of this arrangement is that it eliminates the need for the bracket like member (10) as proposed in the embodiment of FIGS. 6 A and 6B. As in the case of the embodiment of FIGS. 6A and 6B the arrangement of FIGS. 7A and 7B acts as to resist any relative torsional forces trying to turn or twist the support structure collar or sleeve relative to the column (1).

In order to provide the facility of locking the structure (2) to the column i.e., when in raised, lowest or any intermediate position arrangements are provided for locking the support structure (2) and thus the wing-like member (3) to the column (1). One such locking arrangement is schematically illustrated in to FIGS. 8A and 8B which Figures schematically illustrate as cross sectional views through the pile/support-column collar/sleeve in the horizontal plane of an embodiment of a locking arrangement an arrangement for releasably locking the structure (2) to the column or pile (1) using a plurality of expandable members or gripper devices (13).

Figure 8A:
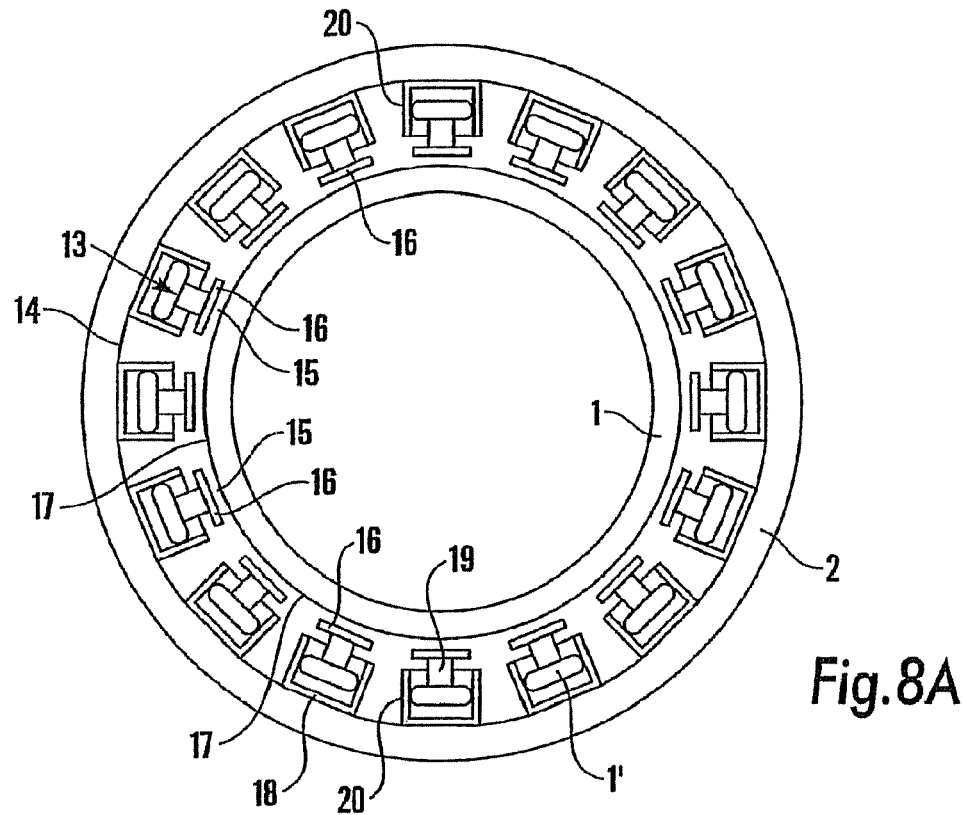
FIGS. 8A and 8B schematically illustrate a releasable gripper type mechanism/arrangement for positionally locking the support structure collar or sleeve with respect to the upstanding column or pile, with FIG. 8A illustrating the mechanism/arrangement in its release setting and FIG. 8B illustrating the mechanism/arrangement when in its locking setting.

In the FIG. 8A the expandable gripper members (13) are securely attached to the inside surface (14) of the collar (2) and are illustrated when in their contracted, that is release setting such that there is a clearance (15) between the gripping surface of a gripping/friction pad (16) and the outer surface (17) of the pile or column (1). When in the setting shown in FIG. 8A the assembly consisting of the collar/sleeve (2) with its internally arranged expandable members or gripper devices (13) can be either moved axially up or down the pile or column (1) or rotated with respect to the pile or column (or both types of movement may take place). In the FIGS. 8A and 8B, the grippers (13) as illustrated are shown as short hydraulic or pneumatic rams (18) having pistons (19) displaceable within cylinders (20) and disposed with their axes radially arranged with respect to the support structure collar and the pile.

Figure 8B:
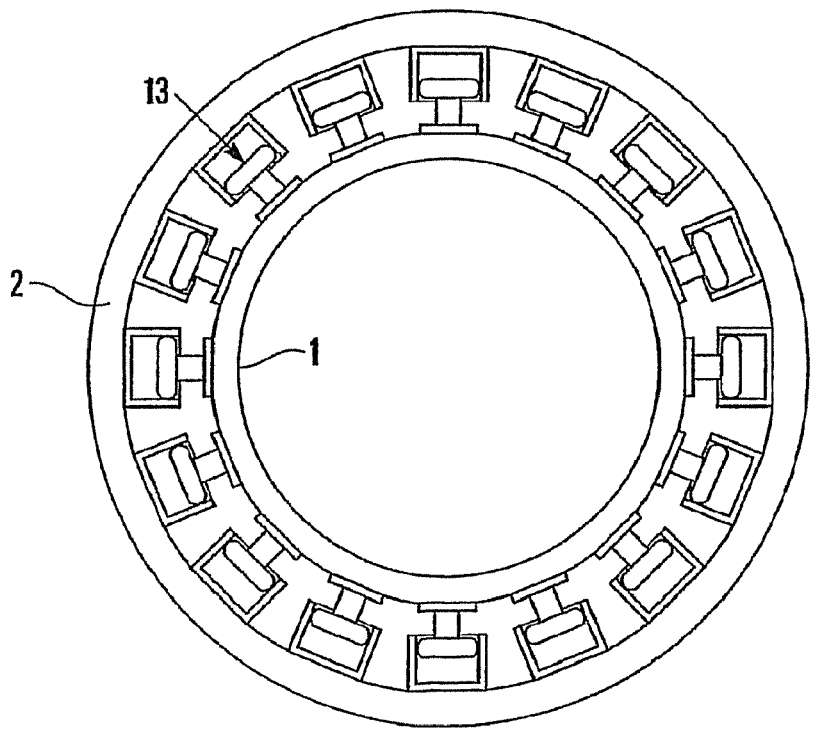

In the FIG. 8B the grippers (13) are illustrated in their locking setting, the rams (18) having been activated by being suitably pressurised whereby the pistons are made to press the friction surfaces (16) of the friction pads radially towards the outer surface (17) of the column (1) with sufficient pressure such that the support structure (2) becomes locked to or gripped to the column (1) such that it will resist movement relative to the column in any direction.

Although for illustrative purpose the use of hydraulic or pneumatic rams has been indicated these may not necessarily form the most practical means for achieving the desired gripping effect due to the limited space (15) between the collar/sleeve (2) and outer surface (17) of the column (1). In practice it has been found advantageous to minimise this space (15) in order to keep the dimensions of the collar as small as possible both to save cost and weight and also to minimise the disturbance the column (1) will cause to the passing flow of water (or air). Hence, in principle in relation to the present invention where grippers are used to lock a structure (2) to a column or pile any other mode of operation may be used such as, for example, expandable mechanisms, be it hydraulic, pneumatic, mechanical or electrically activated. Furthermore wedges or screws may be used instead of jacks or rams as is normal engineering practice.

Figure 9C:
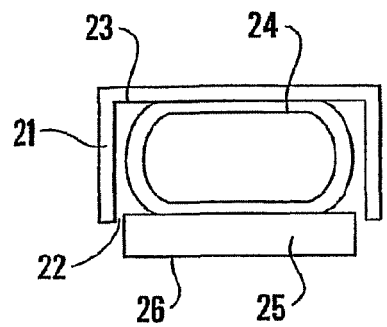
FIG. 9C schematically illustrates to an enlarged scale a detail of the mechanism/arrangement of FIGS. 9A and 9B.
Figure 9A:
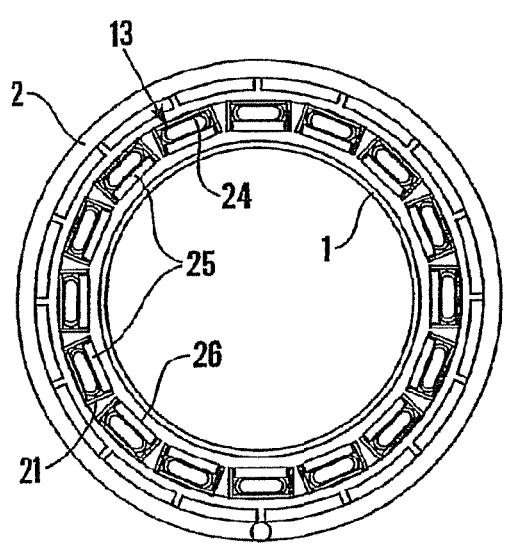
FIGS. 9A and 9B schematically illustrates a further embodiment of a releasable gripper type mechanism/arrangement for positionally locking the support structure collar or sleeve with respect to the column, with FIG. 9A illustrating the mechanism/arrangement in the release setting and FIG. 9B illustrating the mechanism/arrangement when in its locking position.
Figure 9B:
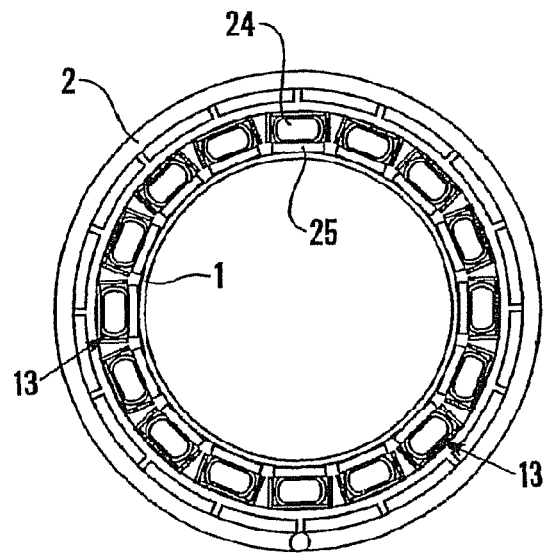

Referring now to FIGS. 9A, 9B, 9C and FIG. 10. FIGS. 9A and 9B. These Figures schematically illustrates a further embodiment of a gripper mechanism/arrangement for locking the collar structure to the column (1) In FIGS. 9A and 9B the pile or column (1) is shown by a horizontal section across the pile or column (1) and the collar (2) and as where it is surrounded by the collar or sleeve (2). The gripper mechanism/arrangement includes a plurality of gripper devices (13) deployed internally of the collar.

In this FIG. 9A the devices (13) are in their relaxed settings to allow the collar/sleeve (2) to move freely with respect to the pile. In the FIG. 9B the devices (13) are in the setting in which they engage with and grip the column (1) and prevent any relative movement.

FIG. 9C shows an enlarged cross-sectional view of a single gripper unit (13). The gripper unit (13) includes a rigid and strong box-like encasement (21) open on the internal side (22) facing the pile or column (1) and attached on its closed 5 side (23) to the inner face (14) of the collar/sleeve (2). Inside the encasement (21) is a close fitting elastomeric bag, bladder or tube (24). The open part of the encasement is closed with a moveable rigid pad of friction material (25) which may in some cases be a separate item or in some cases may advantageously be attached or bonded to the bladder or elastomeric bag (24). The external face (26) of said friction material (25) is preferably shaped to the radius of the pile or column (1) so that when pressed against the outer surface (17) of the pile or column (1) it fits accurately.

It can be seen that if a fluid (whether gas or hydraulic) is pumped into the elastomeric inner tube or bladder (24), it will inflate and press the friction material (25) with potentially great force against the outer surface (17) of the pile or column (1).

FIG. 9B shows that by pressurising all the gripper units (13) simultaneously causes the collar or sleeve (2) is caused to grip the column (1) with great force, while releasing the pressure frees the collar or sleeve (2) to allow it to be moveable lengthways of the column (1).

Whilst the FIGS. 9A, 9B, and 9C illustrate the elastomeric bag or bladder (24) enclosed in a separate enclosure or encasement (21) for each gripper device (13) it is possible make the encasement integral with the sleeve or collar such that it has internal approximately radially disposed flanges such that the bladders (24) may be retained between pairs of such flanges.

Figure 10A:
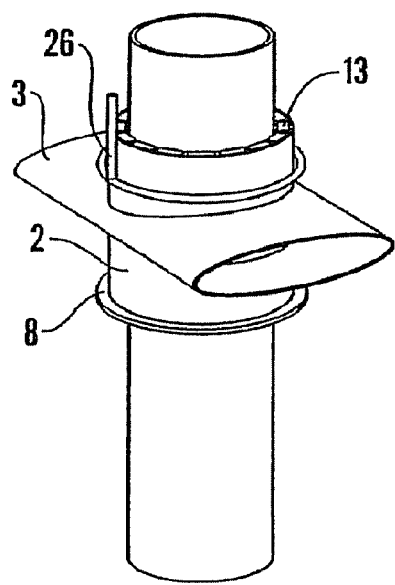
FIG. 10A schematically illustrates in perspective view a further embodiment of a ripper mechanism when associated with a supporting column/pile and a turbine support wing like member of which only a short length of the column and member are shown.
Figure 10B:
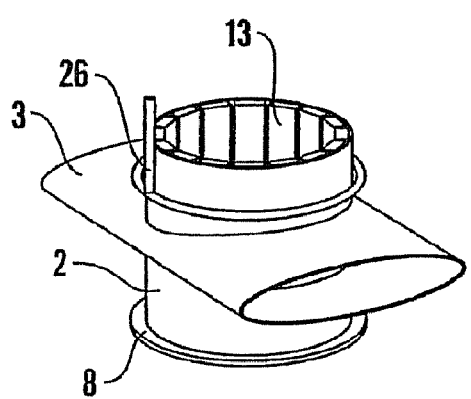
FIG. 10B is a perspective view of the support structure and wing member, and gripper mechanism of FIG. 10A.
Figure 10C:
FIG. 10C is a perspective view of a detail of the mechanism shown in FIGS. 10A and 10B.

Whilst the previously discussed FIGS. 8A, 8B, 9A, 9B and 9C indicate the basic principle of the gripper arrangements FIG. 10A, FIG. 10B and FIG. 10C indicates a further embodiment of these Figures. FIG. 10B illustrates, for greater clarity, the structure of collar or sleeve with the grippers on its own. FIG. 10A schematically illustrates the combination of the support structure (2) and gripper devices (13) and a portion of a wing-like support arm (3). From the FIG. 10A it can be seen that a plurality of gripper devices (13) of the kind with inflatable internal bladders as shown in FIGS. 9A, 9B and 9C are arranged and attached securely around the inside surface (14) of the collar or sleeve (2). It is to be noted that as an alternative possibility the grippers can be installed between internal vertical radial flanges arranged around the inside surface of the sleeve or collar.

A manifold (26) permits a gas such as air, or a hydraulic fluid to be distributed to all the gripper devices (13) from an external pump or compressor unit (not illustrated). In some embodiments there may be more than one manifold so that the gripper devices (13) may be grouped in such a way that if a leak develops, only some sub-set of the gripper devices will be effected and the unaffected ones may be pressurised sufficiently to achieve the necessary grip. For example if there are 24 gripper devices (13), there may be four manifolds, each equipped with non-return valves, such that a leak from one bladder or system would leave 18 effective gripper devices even if 4 were temporarily ineffective pending repairs. The top of the collar or sleeve may have a detachable cover (27) which may be removed to allow access to the gripper devices so that they may individually be detached and removed vertically for maintenance or repairs at times when the entire system is raised. In such an event the collar (2) will have provision to raise it and then to lock it mechanically to the structure at the top of the pile or column so that the gripper devices may be de-activated without allowing the collar or sleeve to drop.

Figure 11A:
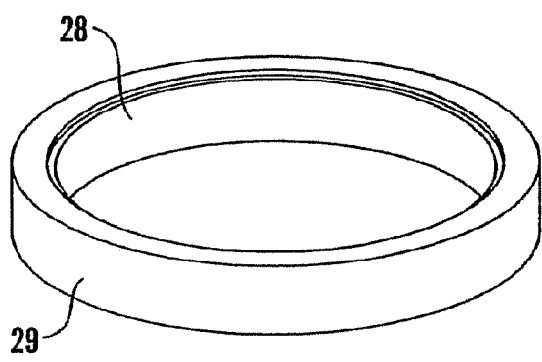
FIG. 11A is a perspective view of a circumferential type of expandable gripper mechanism.
Figure 11B:
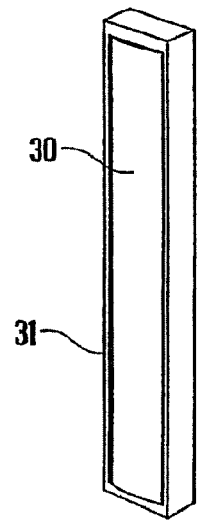
FIG. 11B is a perspective view of a linear type of expandable gripper unit.

FIGS. 11A and 11B illustrates variations of the gripper arrangement/unit described in relation to FIGS. 9A to 9C. In particular FIG. 11A shows that a circular bladder (28), similar to the inner tube of a motor vehicle tyre, may be partially enclosed within a suitable circumferential encasement (29). FIG. 11B illustrates a linear bladder (30) in a rectangular encasement. (31). The gripper arrangement/unit with the circular bladder (28) would be set into the collar in the horizontal plane so that it inflates and grips the column (1) horizontally, whereas the linear gripper (30,31) as previously described is arranged to grip vertically.

Figure 12A:
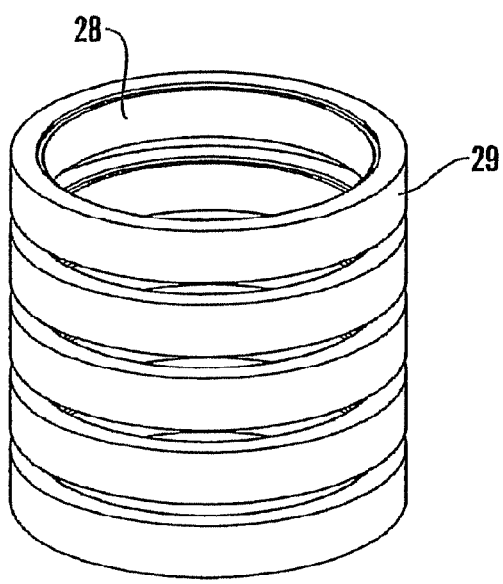
FIG. 12A is a perspective view illustrating how a number of the gripper units shown in FIG. 11A can be stacked.

FIG. 12A schematically indicates how a multiplicity of the circular arrangements/units (28,29) can be arranged, on a column or pile (not shown).

Figure 12B:
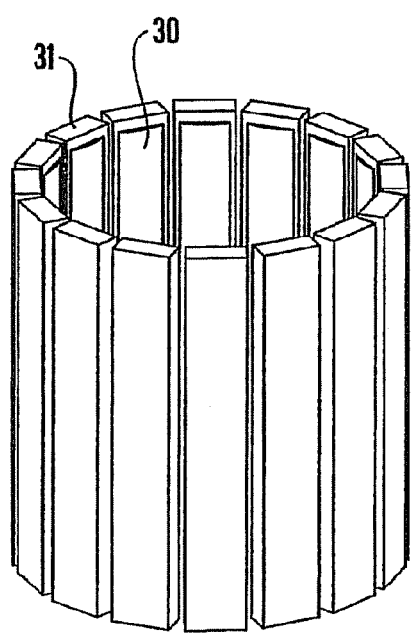
FIG. 12B is a perspective view illustrating how a number of gripper units shown in FIG. 11B may be circumferentially arranged.

FIG. 12B schematically indicates how a multiplicity of the linear arrangements/units (30,31) can be arranged, on a column or pile (not shown).

Figure 13A:
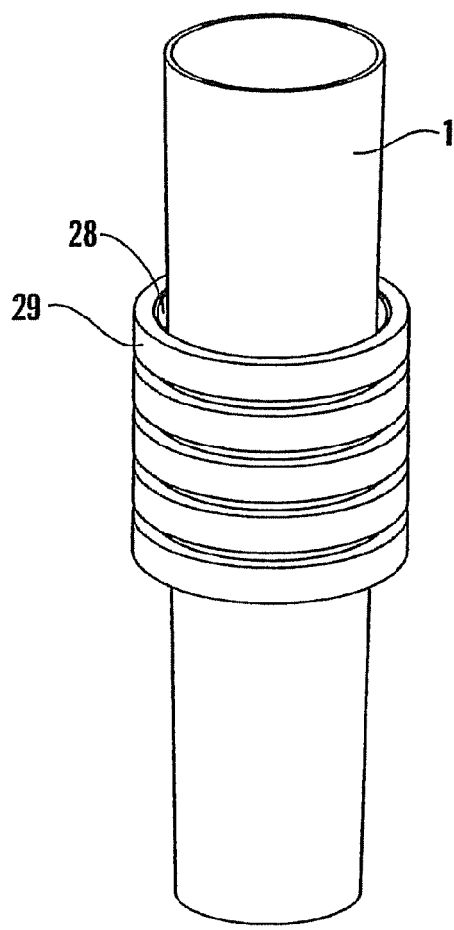
FIGS. 13A and 13B respectively show how the gripper units shown in FIGS. 12A and 12B may be arranged so that a plurality of gripper units may be arranged on a column or pile shown in ghost representation.
Figure 13B:
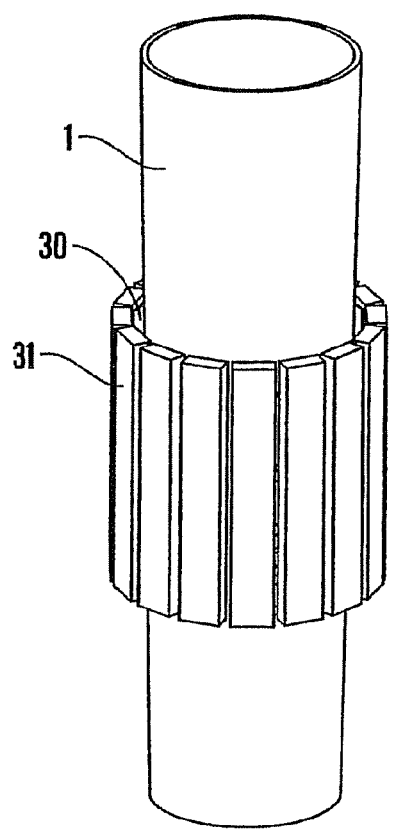

FIGS. 13A and 13B respectively schematically illustrate the arrangements of FIGS. 12A and 12B when positioned on a column or pile (1).

Figure 14:
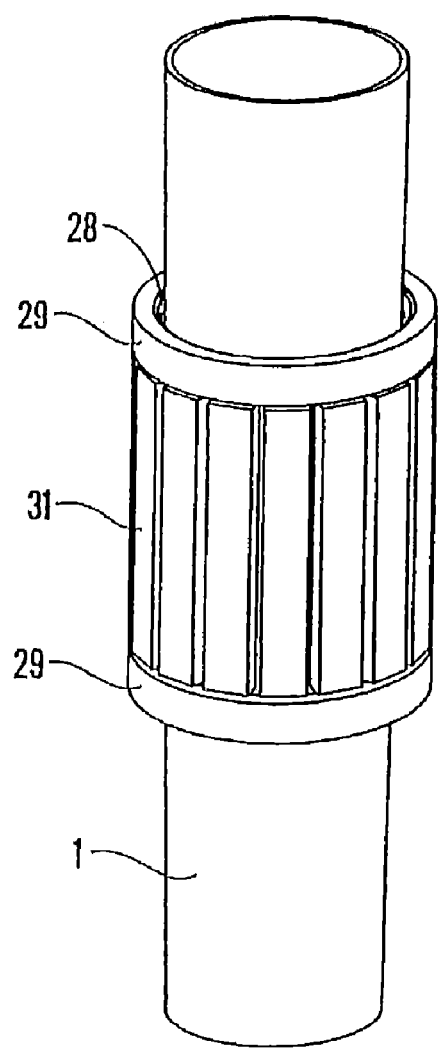
FIG. 14, shows one possible arrangement as to how circumferentially arranged gripper units may be used in conjunction with the linear form gripper units. Other patterns than this may of course be used.

FIG. 14 indicates how a combination of linear grippers arrangements/units (30,31) and circular grippers arrangements/units (28,29) may be applied to a column or pile (1), (again with the sleeve omitted for clarity). The reason for the two types of gripper is that the circular gripper is likely to be most effective to lock the support structure (2) against vertical movement while the linear gripper is most effective to lock it against torsional movement with respect to column (1). In practice, either form of gripper is effective in both vertical movement and in torsion but they offer different degrees of stiffness.

Figure 15:
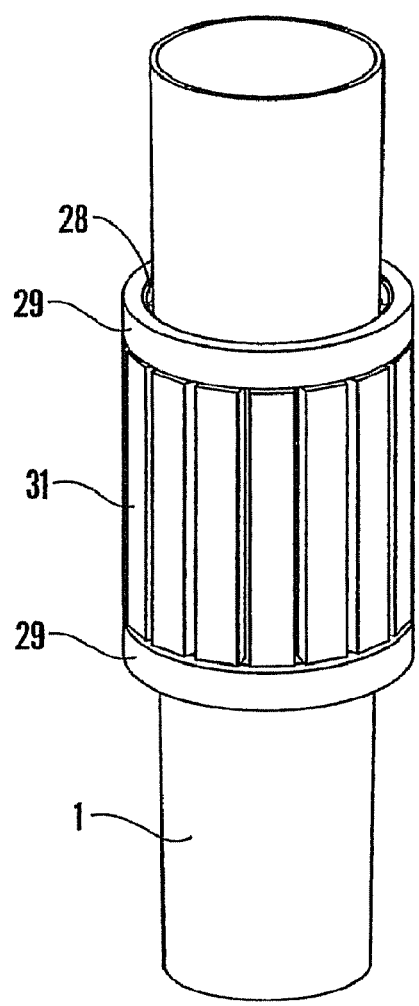
FIGS. 15A, 15B and 15C schematically illustrate in a sequence of three perspective views of a column or pile provided with two collars, each containing gripper units, and connected by hydraulic or pneumatic rams or other such linear actuators, so that one gripper unit may be fixed and the other may be moved axially from it by the linear actuators.
FIGS. 15D, 15E and 15F schematically illustrate in a sequence of three views of a column or pile provided with two collars, each containing gripper units, and connected by hydraulic or pneumatic rams or other such linear actuators, so that one gripper unit may be fixed and the other may be moved axially from it by the linear actuators.
Figures 15A, 15B, 15C:
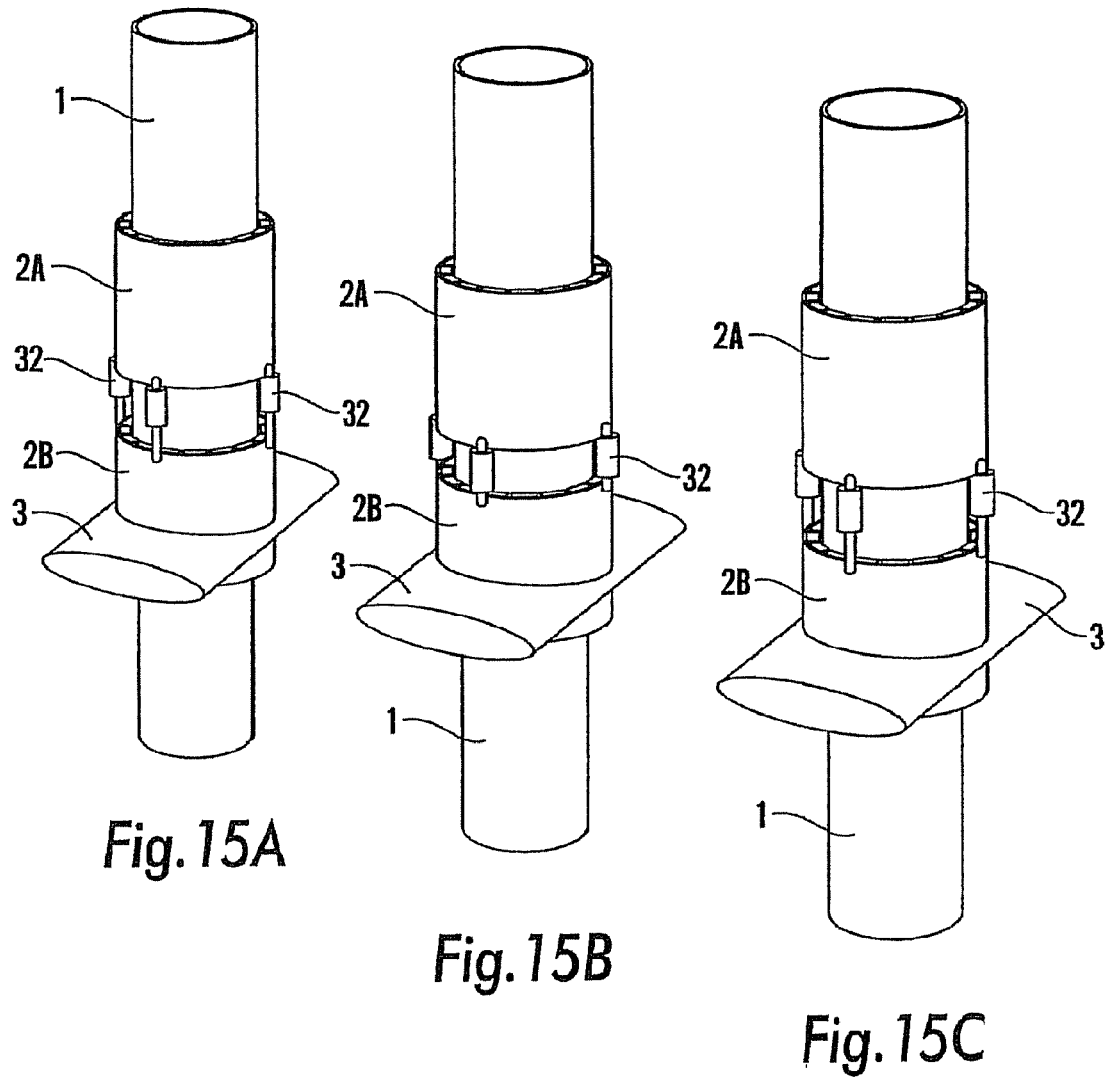

FIGS. 15A to 15F shows a major variation of the proposals of the invention in which two collars (2A) and (2B) are provided on the same pile (1). As will be seen from the Figures the collar 2B mounts the turbine carrying cross arm 5. The gripper units 2A and 2B are such that they can be independently made to grip the column or pile or be released from their gripping action. The two collars 2A and 2B are interconnected by extendable and contractible actuators (32) such as hydraulic rams, pneumatic rams or screw jacks. The use of four such extendable actuators is shown in the Figures. In practice, other numbers of the actuators may be used, but preferably should be symmetrically disposed around the circumference of the collars. FIGS. 15A, 15B and 15C is a perspective view and FIGS. 15D, 15E and 15D are elevations showing a possible sequence of operational events in which in FIG. 15A the upper collar (2A) is gripped to the pile (1) and the collar (2B) is released. As indicated by FIG. 15B the lower collar (2B) is raised by contracting the actuators (32), thereby raising collar (2B) and the cross-arm (3) and its attached turbines and rotors (4) by the distance equivalent to the actuator stroke. The lower collar (2B) is then made to grip the column (1) by activating its grippers and the upper collar (2A) is released so that when the actuators (32) are expanded as indicated in FIG. 15C the upper collar (2A) is raised. The upper collar (2A) may then be made to grip the column or pile (1) the lower collar (2B) can be released and the process can be repeated so as to raise both collars up the pile or column (1) by the approximate actuator stroke distance each cycle. This process can have two important purposes;

i) it can be used as the method for lifting the cross-arm and turbines clear of the water surface (or for lowering a wind turbine to near ground level) as in FIG. 1;

ii) it can be used in the case of a tidal current turbine to vary the position of the turbine rotors in the water column. This is important in a location with a high tidal range as most of the energy in the stream is near the surface, so at high tide the system can follow the surface and thereby extract slightly more energy than if it remained in one place below the low tide position;

iii) in severe weather conditions it can be used to lower the system near to the seabed so as to minimise disturbance and turbulence caused by large passing waves.

Figure 16C:
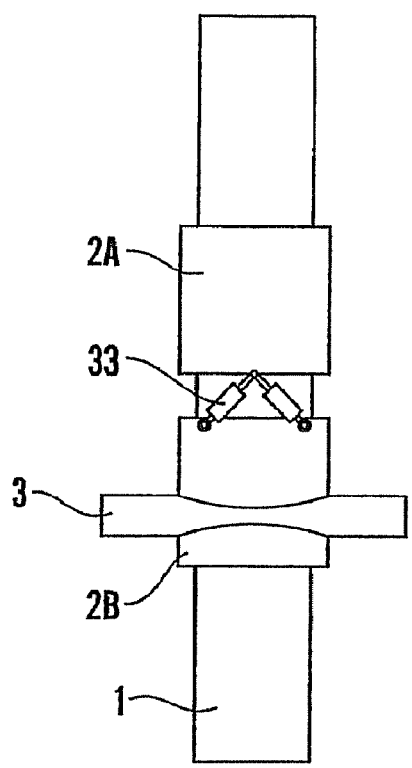
FIGS. 16C and 16D, schematically illustrate further relative positions of the collars illustrated in FIGS. 16A and 16B.
Figure 16D:
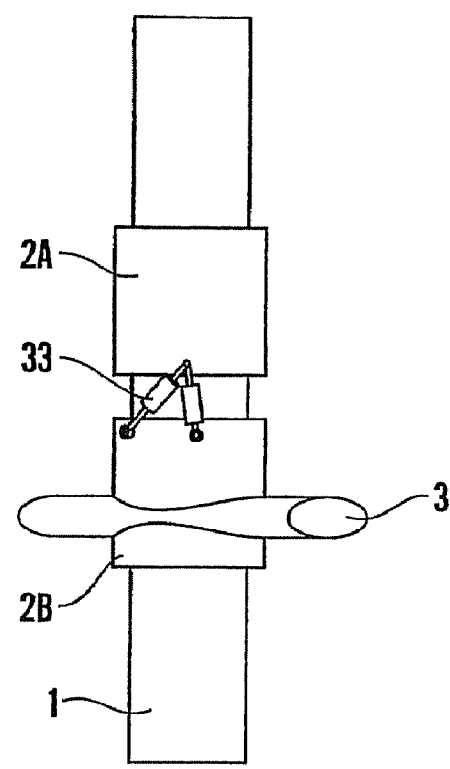

FIGS. 16A, 16B, 16C, and 16D, illustrate a variation of the embodiment of FIG. 15, with FIGS. 16A, 16B perspective views and FIGS. 16C and 16D elevational views.

As in the case of the embodiment of FIGS. 15A-15F embodiments two collars 2A and 2B are mounted upon the column or pile 1. In this embodiment the two collars are interconnected by to each other by extendible actuators 32 set at an angle to each other in a form of inverted "V" configuration. The attachments for the extendible actuators to the collars need to be some form of knuckle or ball and socket joint such that they can both change their inclination and partially twist relative to the collars/sleeves to which they are attached. It can be seen from FIGS. 16A to 16D that by locking the grippers on the upper collar (2A) to the column or pile (1), releasing the grippers for the lower pile (2B) and then extending one of each pair of inclined extendible actuators (33), has the effect of rotating the lower collar (2B) about the axis of the column or pile relative to the upper collar (2A). The lower collar (2B) can then be made to grip the column or pile and by releasing the upper collar (2A) it can be pulled back by retracting the extended actuator into alignment with the lower collar (2B). This process can then be repeated to yaw the lower collar slightly further. In this way the turbine rotor orientation can be changed in situations where the currents are not in alignment between the ebb tide and the flood tide.

Referring now to FIGS. 17A/17B, 17C and 17D these Figures shows how the arrangement of FIGS. 16A to 16D can be used to raise or lower the collar and cross arm by activating the grippers in the upper collar 2A and releasing the grippers on the lower collar 2B as indicated in Figure IA. Then by retracting or shortening both of the extendible actuators (33) the lower collar (2B) with the cross-arm and rotors is lifted by a small amount. The lower collar (2B) can then be set to grip the pile while the upper collar (2A) is released so it can be lifted by the extendible actuators (33) working together thus producing a stepping process that can then be repeated until a desired vertical position is reached on the column or pile.

It will be understood from the forgoing descriptions relating the various Figures that the present Application can conveniently be regarded in so far as it has discussed the use of the arrangements of the present in relation to water current driven and air driven turbines it is not limited to such usage and can more generally be regarded as relating to means for positionally locking an article/load associated with a tubular support structure which is serves as an article to be positionally located upon an upstanding support or to provided a means whereby an article/load may be selectively positionally mounted upon an upstanding support column, upon which it is slidably concentrically mounted. In so far as the present disclosure is concerned with the positioning of turbine installations, it can be regarded as providing developments of arrangement previously described in our earlier above mentioned British Patents and their various foreign derivatives. Namely a flowing water current or air (wind) actuatable turbine system, including one or more support columns or piles set on suitable foundations in an upstanding manner from a river or sea bed (or from the ground in the case of a wind turbine) so as to project above the sea or river water surface at all times in the case of a water current turbine system. A sleeve or collar concentrically surrounds each of said piles or columns and is provided such that it can be moved vertically up or down relative to the piles or columns. The sleeve or collar arrangement carries directly (or indirectly via a subsidiary structure) one or more turbine rotors and their required power trains (i.e., power trains means gearboxes, generators, pumps, compressors or other such means to make practical use of the rotor shaft power). The aforementioned subsidiary structure to carry the rotors and power trains may preferably be a streamlined wing-like member approximately horizontally arranged across the direction of fluid flow, and securely attached to the aforementioned sleeve or collar; said wing like member(s) may be cantilevered either side of the said sleeve or collar or it may bridge between sleeves and collars on two or more upstanding columns or piles. In particular the present invention is concerned with novel methods by which the aforementioned concentrically arranged sleeve(s) or collar(s) may be locked or engaged, and unlocked and disengaged on demand from the upstanding substantially vertical supporting column of pile. The purpose being to securely fix the driven turbine rotors and drive trains in place when operational and under load, but to permit them to be released and raised above the surface of the sea or water for maintenance or repair. A sub-set of this patent application relates to its use for wind turbines where the rotor and power train may be locked in place on a vertical column for operation when raised but may be released or disengaged from said column to permit lowering them to near ground level for ease of maintenance.

The invention claimed is:

1. A locking arrangement for selectively preventing displacement of a tubular support structure relative to an upstanding elongate support, the tubular support structure being concentrically situated around the upstanding elongate support and displaceable lengthways of the upstanding elongate support comprising a first structure selected from a single tapered internally projecting lug, or a recess, a plurality of such lugs or recesses arranged around a predetermined region of the support structure, wherein the elongate support is provided with a complementary shaped structure adapted for respective engagement with said first structure of the tubular support structure in such manner as positionally to locate the support structure with respect to the elongated support when at a lowermost limit of downward movement, and a rigid containment attached securely to an internal tubular surface of the tubular support structure and opening towards the outer surface of the upstanding elongate support, and wherein said containment houses a closely fitting inflatable container mounting a friction member for co-operation with said outer surface in such manner that the inflatable container is contained on three sides of the containment but can expand outwardly to press the friction member against the outer surface of the elongate support in order to exert a grip on the elongate support to prevent lengthways displacement and thereby maintain the support structure and any article/load carried thereby in a required position relative to the elongate support with sufficient force to prevent torsional yawing of the tubular support structure about the elongate support, and apparatus coupled to the tubular support structure for supporting an article/load with respect to the upstanding elongate support.

2. A locking arrangement for selectively preventing displacement of a tubular article/load support structure relative to an upstanding elongate support, the tubular support structure circumscribing the upstanding elongate support and adapted for lengthways displacement along upstanding elongated support, wherein the tubular support structure is provided with a first structure selected from a single tapered internally projecting lug, or a recess, a plurality of such lugs or recesses arranged around a predetermined region of the support structure, wherein the elongate support is provided with a complementary shaped structure adapted for respective engagement with said first structure of the tubular support structure in such manner as positionally to locate the support structure with respect to the elongated support when at a lowermost limit of downward movement, and wherein the tubular support structure incorporates a rigid containment attached securely to an internal tubular surface of the tubular support structure and opening towards the outer surface of the upstanding elongate support, and wherein said containment houses a closely fitting inflatable container mounting a friction member for co-operation with said outer surface in such manner that the inflatable container is contained on three sides of the containment but can expand outwardly to press the friction member against the outer surface of the elongate support in order to exert a grip on the elongate support to prevent lengthways displacement and thereby maintain the support structure and any article/load carried thereby in a required position relative to the elongate support with sufficient force to prevent torsional yawing of the tubular support structure about the elongate support.

3. A locking arrangement as claimed in claims 1 or 2, wherein the gripper devices are operable between a non-gripping rest position in which the associated tubular support structure can be displaced lengthways of the elongate support, and an operated gripping setting in which the support structure is effectively locked against displacement relative to the elongate support.

4. A locking arrangement as claimed in claim 1 or 2, further comprising at least one source of compressed gas, or pressurized liquid or fluid delivered from a pressurized plenum supply coupled to said inflatable container.

5. A locking arrangement as claimed in claim 4, wherein said gripper device comprises a plurality of gripper devices arranged for actuation in groups from separate plenum supplies, whereby if a leak develops in a said plenum supply the leak will only effect the group of gripper devices connected with the associated plenum supply thereby leaving sufficient redundancy for the unaffected groups to achieve the required force necessary for the associated tubular support structure to be securely locked to the upstanding elongate support.

6. A locking arrangement as claimed in claim 5, wherein the gripping devices are arranged horizontally and circumferentially on the internal surface of the tubular support structure and comprise a plurality of circular containments attached securely to the inner surface of the tubular support structure but open internally where they face the outer surface of the upstanding elongate support, and wherein the containments house closely fitting doughnut-shaped inflatable bags/containers whereby said inflatable bags/containers are contained on three sides above, below and where they contact the inner surface of the support structure.

7. A locking arrangement as claimed in claim 5, wherein the gripping devices are of an elongate form and are arranged vertically and circumferentially on the internal surface of the tubular support structure and comprise a plurality of rectangular containments attached securely to the inner surface of the tubular support structure but open internally where they face the outer surface of the upstanding elongate support, and wherein the containments house closely fitting rectangularly shaped inflatable bags/containers in such manner that said inflatable bags/containers are contained on three sides above, below and where they contact the inner surface of the support structure.

8. A locking arrangement as claimed in claims 1 or 2, wherein each gripper device comprises a hydraulic or pneumatic ram or a mechanical screw-jack arrangement.

9. A locking arrangement as claimed in claim 8, wherein the rams or screw jack arrangements are arranged to operate radially or to drive wedge shaped elements against the elongate support outer surface in such manner as to generate sufficient force against the outer face of the upstanding elongate support so as effectively to lock the support structure to the elongate support whenever it is desired to prevent displacement of tubular support structure relative, to the elongate support.

10. A locking arrangement as claimed in claim 1 or 2, wherein the tubular support structure sleeve has circumferential flanges serving to reinforce its upper and lower edge regions thereof and to inhibit flexing and distortion.

11. A locking arrangement for selectively preventing displacement of a first tubular support structure relative to an upstanding elongate support, the tubular support structure being concentrically situated around the upstanding elongate support and displaceable lengthways of the upstanding elongate support comprising gripper devices arranged internally and concentrically of the tubular support structure, wherein said gripper devices are operable to cooperate with an outer surface of the upstanding elongate support between a non-gripping rest position in which the associated tubular support structure can be displaced lengthways of the elongate support, and an operated gripping setting in which the support structure is effectively locked against displacement relative to the elongate support in such manner as to prevent lengthways displacement and thereby maintain the support structure and any article/load carried thereby in a required position relative to the elongate support and with sufficient force to prevent torsional yawing of the tubular support structure about the elongate support, and apparatus coupled to the tubular support structure for supporting an article/load with respect to the upstanding elongate support, and including a second tubular structure circumscribing the elongate support for movement lengthways of the elongate support, the second tubular support structure being so interconnected with the first tubular support structure as enable the two tubular support structures to be alternately operated between the locking and unlocked settings at required lengthways positions thereof in such manner as to be able maintain the article/load at a required position relative to the elongate support.

12. A locking arrangement as claimed in claim 11, wherein means are provided for enabling the two tubular support structures to be controllably displaceable relative to each other with respect to the associated elongate support in such manner that the article/load is continuously supported by/from the associated elongate support during lengthways displacement thereof relative to the associated elongate support.

13. A locking arrangement as claimed claim 12, wherein the article/load includes at least one turbine installation.

14. A locking arrangement as claimed in claim 11 or 12, wherein the second tubular support structure is so interconnected with the first tubular support structure as enable the two tubular support structures to be alternately operated between the locking and unlocked settings at required positions in such manner as to turn one of the tubular support structures relative to the other through an angle about an axis of the elongate support.

15. An locking arrangement for selectively causing displacement of a first tubular support structure relative to a second tubular support structure and an upstanding elongate support, the first and second tubular support structures being concentrically situated around the upstanding elongate support and displaceable relative to the upstanding elongate support, the first and second tubular support structures comprising gripper devices arranged internally and concentrically of each tubular support structure, the gripper devices being operable to cooperate with an outer surface of the upstanding elongate support between a non-gripping rest position in which the associated tubular support structure can be displaced relative to the elongate support, and an operated gripping setting in which the associated tubular support structure is effectively locked against displacement relative to the elongate support in such manner as to prevent displacement and thereby maintain the support structure and any article/load carried thereby in a required position relative to the elongate support, and apparatus coupled to at least one of the tubular support structures for supporting an article/load with respect to the upstanding elongate support, the second tubular support structure being so interconnected with the first tubular support structure as enable the two tubular support structures to be alternately operated between the gripping and non-gripping settings at required positions in such manner as to turn one of the tubular support structures relative to the other through an angle about an axis of the elongate support.

16. A locking arrangement as claimed claim 15, further comprising extendable actuators coupling the first and second tubular support structures to each other, at least some of the extendable actuators being set at an angle to each other.

17. A locking arrangement as claimed claim 16, further comprising attachments for the ends of at least some of the extendable actuators, the attachments being selected from knuckle and ball and socket joints permitting the actuators to change inclination during the turning of one of the tubular support structures relative to the other.

* * * * *